(12) United States Patent
Shen et al.

(10) Patent No.: US 12,055,418 B2
(45) Date of Patent: *Aug. 6, 2024

(54) METHOD AND SENSOR SYSTEM WITH INTEGRATED CALIBRATION MECHANISM

(71) Applicant: TEXAS INSTRUMENTS INCORPORATED, Dallas, TX (US)

(72) Inventors: Ge Shen, Shanghai (CN); Jun Zhang, Shanghai (CN); Songhua Hu, Shanghai (CN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/677,930

(22) Filed: Feb. 22, 2022

(65) Prior Publication Data

US 2022/0178727 A1 Jun. 9, 2022

Related U.S. Application Data

(63) Continuation of application No. 16/287,654, filed on Feb. 27, 2019, now Pat. No. 11,280,646, which is a continuation of application No. PCT/CN2018/107540, filed on Sep. 26, 2018.

(51) Int. Cl.
  *G01D 18/00* (2006.01)
(52) U.S. Cl.
  CPC .................. *G01D 18/008* (2013.01)
(58) Field of Classification Search
  None
  See application file for complete search history.

(56) References Cited

U.S. PATENT DOCUMENTS

| 4,263,803 A * | 4/1981 | Burkhardt ............ G01D 18/008 33/502 |
| 5,005,142 A | 4/1991 | Lipchak et al. |
| 6,952,966 B2 | 10/2005 | Itakura |
| 7,340,955 B2 | 3/2008 | Manninen |

(Continued)

FOREIGN PATENT DOCUMENTS

| CN | 202928736 U | 5/2013 |
| CN | 106681210 A | 5/2017 |

(Continued)

OTHER PUBLICATIONS

Notification of First Office Action mailed Sep. 9, 2022, Chinese Application No. 2018800980190, 32 pages.

(Continued)

*Primary Examiner* — Michael J Dalbo
*Assistant Examiner* — Denise R Karavias
(74) *Attorney, Agent, or Firm* — Brian D. Graham; Frank D. Cimino; Xianghui Huang

(57) ABSTRACT

A system generating an electrical signal based on at least one physical quantity, includes sensor units each generating an individual electrical signal in response to the at least one physical quantity, a selecting unit selecting a first number of sensor units from the sensor units and outputting a first combined electrical signal based on the first number of sensor units, and a calibrating unit determining a second number of sensor units to be selected based on the first combined electrical signal.

20 Claims, 2 Drawing Sheets

(56) References Cited

U.S. PATENT DOCUMENTS

| | | | |
|---|---|---|---|
| 8,766,833 B1* | 7/2014 | Bogner | H03M 1/1014 341/120 |
| 8,935,105 B2* | 1/2015 | Bessho | B60R 21/015 702/41 |
| 9,772,733 B2 | 9/2017 | Lee | |
| 9,829,356 B1 | 11/2017 | Smith et al. | |
| 2003/0084705 A1 | 5/2003 | Cui et al. | |
| 2003/0216879 A1* | 11/2003 | Hashemian | G01D 3/08 702/183 |
| 2004/0183551 A1 | 9/2004 | Itakura | |
| 2008/0072684 A1* | 3/2008 | Baniecki | G01L 1/148 73/777 |
| 2013/0158895 A1 | 6/2013 | Bessho et al. | |
| 2015/0185267 A1 | 7/2015 | Maharyta et al. | |
| 2015/0220209 A1* | 8/2015 | Nys | G06F 3/044 345/174 |
| 2015/0276790 A1 | 10/2015 | Yonezawa et al. | |
| 2015/0276853 A1 | 10/2015 | Murashima et al. | |
| 2017/0026166 A1 | 1/2017 | Barrenscheen | |
| 2018/0149499 A1 | 5/2018 | Smith et al. | |

FOREIGN PATENT DOCUMENTS

| | | |
|---|---|---|
| IN | 207008375 U | 2/2018 |
| JP | 2004279261 A | 10/2004 |

OTHER PUBLICATIONS

International Search Report dated Jul. 3, 2019, PCT Application No. PCT/CN2018/107540, 7 pages.

Written Opinion dated Jul. 3, 2019, PCT Application No. PCT/CN2018/107540, 4 pages.

* cited by examiner

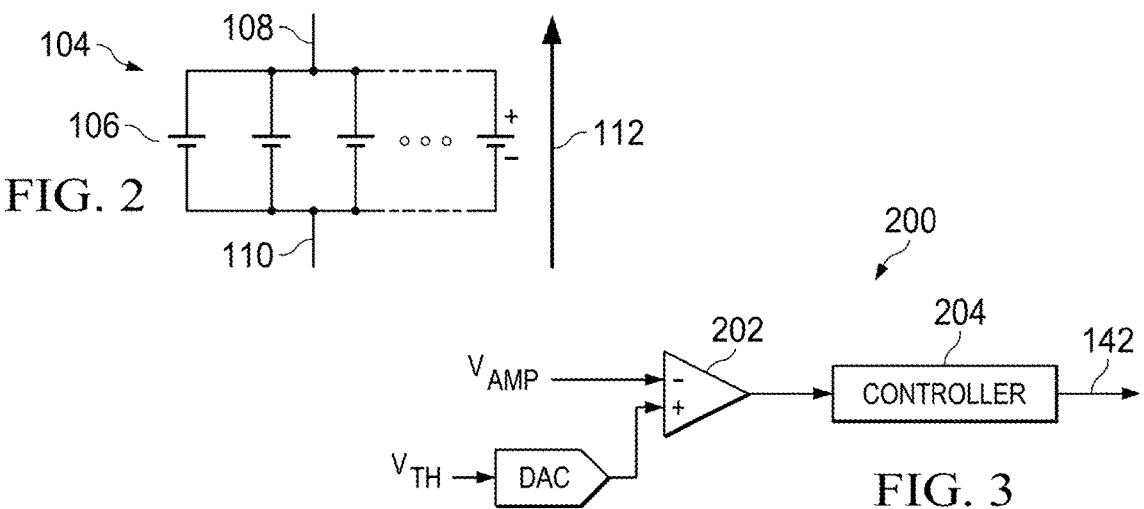
FIG. 2
FIG. 3
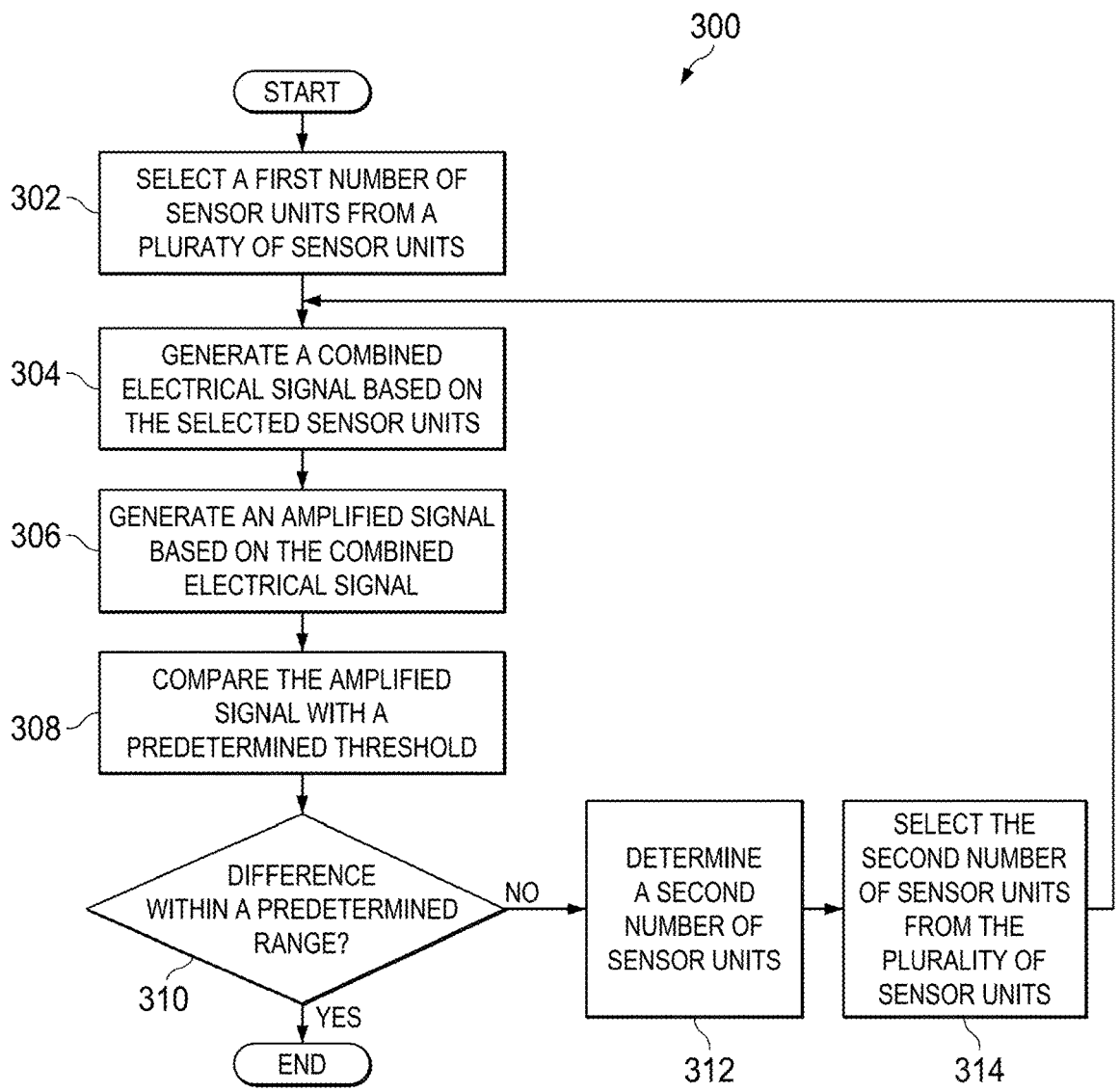
FIG. 4

METHOD AND SENSOR SYSTEM WITH INTEGRATED CALIBRATION MECHANISM

CROSS-REFERENCE TO RELATED APPLICATIONS

This application is a continuation of U.S. patent application Ser. No. 16/287,654 filed Feb. 27, 2019, which is a continuation of PCT Application No. PCT/CN2018/107540 filed Sep. 26, 2018, all of which are hereby incorporated herein.

TECHNICAL FIELD

The present invention relates to a sensor system and, more particularly, to a sensor system with an integrated calibration mechanism.

BACKGROUND

Sensor systems are widely used to sense a physical quantity such as force/pressure, temperature, light level, position, speed, or sound, etc., and convert it into an analogue quantity which can be measured electrically such as voltage, capacitance, inductance or ohmic resistance. A sensor system usually comprises a sensor device mounted onto a printed circuit board (PCB) with input and output terminals. However, due to errors caused by different factors, such as electrical connection between the sensor device and PCB, package type of the sensor device, dimensional characteristics of the PCB, mounting location of the sensor device on the PCB, differences of other components in the sensor system such as a mass or a cantilever, etc., each sensor system needs to be calibrated before being put into use.

SUMMARY

The present invention relates to sensor systems that generate electrical signals based on at least one sensed physical quantity. In one example, a system includes a number of sensor units each generating an individual electrical signal in response to the at least one sensed physical quantity. The system further includes a selecting unit, coupled to the plurality of sensor units, configured to a first number of sensor units from the plurality of sensor units and outputs a first combined electrical signal based on the first number of sensor units, and a calibrating unit, coupled to the selecting unit, configured to determine a second number of sensor units to be selected based on the first combined electrical.

In another example, the present invention provides a method for calibrating a system having a number of sensor units that generates an electrical signal in response to at least one sensed physical quantity, wherein each sensor unit generates an individual electrical signal in response to the at least one sensed physical quantity. The method includes: selecting, performed by a selecting unit, a first number of sensor units from the plurality of sensor units; generating a first combined electrical signal based on the first number of sensor units; and determining, performed by a calibrating unit, a second number of sensor units.

BRIEF DESCRIPTION OF THE DRAWINGS

FIG. 2 is a schematic enlarged diagram of a single sensor unit of the sensor system of FIG. 1 in accordance with an embodiment of the present invention;

FIG. 3 is a schematic block diagram of a calibrating unit of the sensor system of FIG. 1 in accordance with an embodiment of the present invention; and FIG. 4 is a flow chart of a method for calibrating a sensor system in accordance with another embodiment of the present invention.

DETAILED DESCRIPTION

Figure 1:
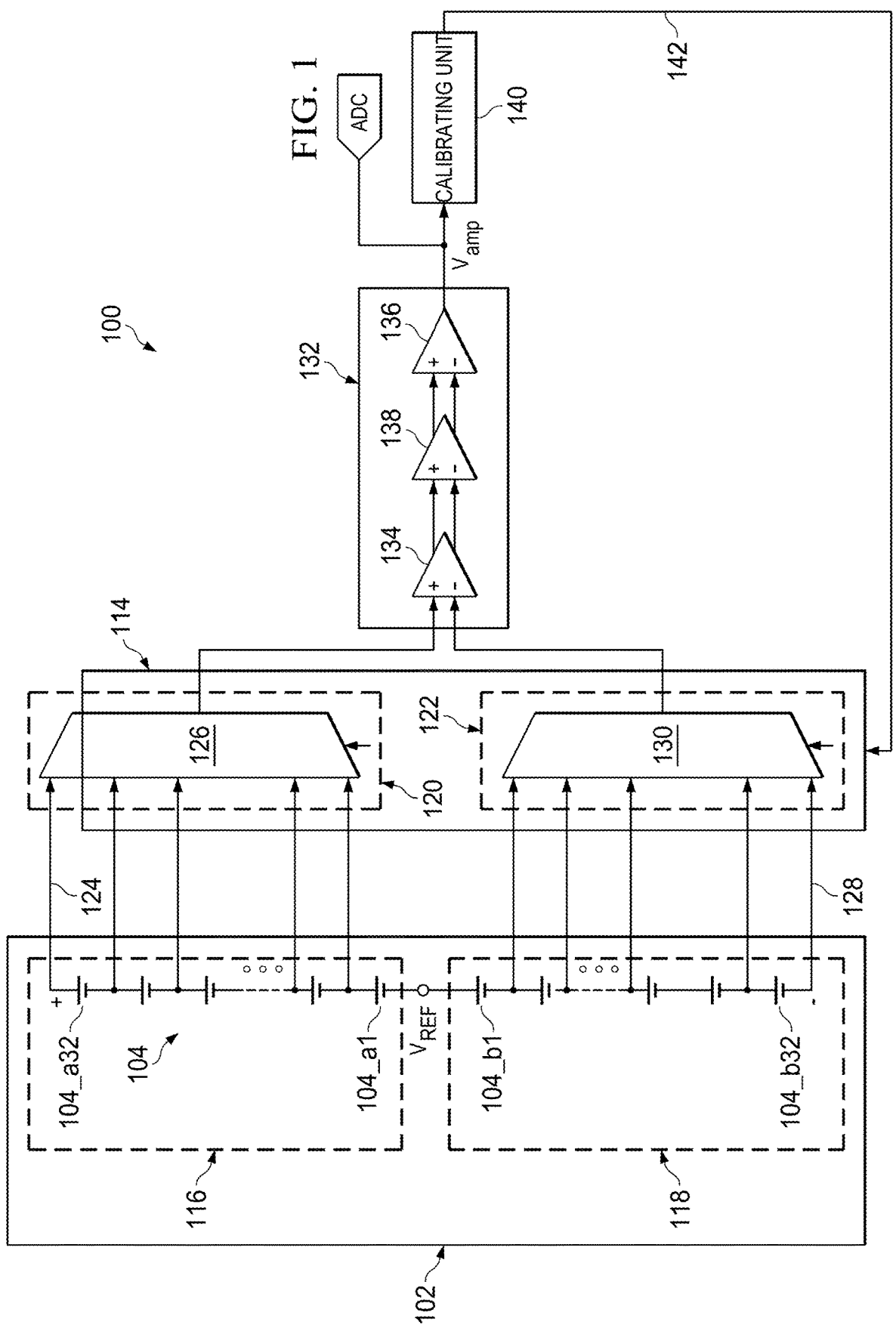
FIG. 1 is a schematic block diagram of a sensor system with an integrated calibration mechanism in accordance with an embodiment of the present invention.

In an embodiment of the present invention, a system generating an electrical signal based on at least one sensed physical quantity is provided. The system includes a plurality of sensor units each generating an individual electrical signal in response to the at least one sensed physical quantity, a selecting unit, coupled to the plurality of sensor units, that selects a first number of sensor units from the plurality of sensor units and outputs a first combined electrical signal based on the first number of sensor units, and a calibrating unit, coupled to the selecting unit, that determines a second number of sensor units to be selected based on the first combined electrical.

In another embodiment, the present invention provides a method for calibrating a system having a plurality of sensor units that generates an electrical signal in response to at least one sensed physical quantity, wherein each sensor unit generates an individual electrical signal in response to the at least one sensed physical quantity. The method includes: selecting, performed by a selecting unit, a first number of sensor units from the plurality of sensor units; generating a first combined electrical signal based on the first number of sensor units; and determining, performed by a calibrating unit, a second number of sensor units to be selected based on the first combined electrical signal.

Referring now to FIG. 1, a schematic block diagram of a sensor system 100 with integrated calibration mechanism in accordance with an embodiment of the present invention is shown. The sensor system 100 is configured to generate an electrical signal based on at least one sensed physical quantity. For example, the sensor system 100 is a force or pressure sensor system and the electrical signal is a voltage signal converted from the force or pressure sensed by the sensor system 100. The sensor system 100 includes a sensor device 102 having a plurality of sensor units 104_$a1$ to 104_$a32$ and 104_$b1$ to 104_$b32$ (collectively, "sensor units 104"), wherein each sensor unit 104 is configured to generate an individual electrical signal in response to the at least one sensed physical quantity. In a preferred embodiment, the sensor device 102 is a lead zirconate titanate (PZT) (or more generally a piezoelectric) strain sensor device that includes the plurality of sensor units 104 arranged in series. Preferably, the number of the plurality of sensor units 104 is $2^n$, wherein n is a natural number greater than 2. In the example shown in FIG. 1, there are 64 sensor units 104 in the sensor system 100. When calibrating the sensor system 100, a known physical quantity is applied to the sensor system 100, and the first number of sensor units 104 is determined based on the known physical quantity.

FIG. 2 is a schematic enlarged diagram of a single sensor unit 104 of the sensor system 100 of FIG. 1. The sensor unit 104 includes at least one sensor element 106 coupled between first and second terminals 108 and 110 of the sensor unit 104. In a preferred embodiment, the sensor element 106 is a ferroelectric capacitor (FECAP), and the sensor unit 104 includes a plurality of ferroelectric capacitors 106 arranged in parallel and coupled between the first and second terminals 108 and 110. For example, the number of the sensor elements in each sensor unit 104 can be 4 or 8. When a force or pressure 112 is applied to the sensor unit 104 in a direction from the second terminal 110 to the first terminal 108, the individual electrical signal, in a preferred embodiment, being a voltage difference between the first and second terminals 108 and 110 of the sensor unit 104, is generated corresponding to a quantity of the force or pressure 112. However, the sensor system 100 is not only limited to be the force or pressure sensor system. For example, the sensor system 100 can be a stretch sensor system, or the like that generates an electrical signal based on a combination of individual signals respectively converted from a physical quantity by a plurality of sensor elements.

Referring back to FIG. 1, the sensor system 100 also includes a selecting unit 114 coupled to the plurality of sensor units 104. The selecting unit 114 selects a first number of sensor units 104 from the plurality of sensor units 104 and outputs a first combined electrical signal based on the first number of sensor units 104. In a preferred embodiment, the first number of selected sensor units 104 are N consecutive sensor units cascaded in a sequence, wherein N is a natural number. The first combined electrical signal is a voltage difference across the N sensor units 104.

In a preferred embodiment, the plurality of sensor units 104 are divided into first and second groups 116 and 118 preferably with same number of sensor units 104 in each group, and both of the first and second groups 116 and 118 of sensor units 104 are sequenced from a joint node of the first and second groups 116 and 118, for example, the second terminal 110 of the first sequential sensor unit 104_$a1$ in the first group 116 and the first terminal 108 of the first sequential sensor unit 104_$b1$ are connected at the joint node. In a preferred embodiment, a voltage $V_{ref}$ at the joint node can be used for zero calibration of the sensor system 100.

In a preferred embodiment, said selecting the first number of sensor units 104 includes selecting a third number of sensor units 104 from the first group 116 and selecting a fourth number of sensor units 104 from the second group 118. Ina preferred embodiment, both the third and fourth numbers of sensor units 104 are selected consecutively from the joint node. In a preferred embodiment, the selecting unit 114 includes first and second selectors 120 and 122 respectively coupled to the first and second groups of sensor units 104. In a preferred embodiment, the first selector 120 is implemented as a plurality of first taps 124 respectively coupled to first terminals 108 of the sensor units 104 in the first group 116, and a first multiplexer 126 having inputs respectively coupled to the plurality of first taps 124. Similarly, the second selector 122 is implemented as a plurality of second taps 128 respectively coupled to second terminals 110 of the sensor units 104 in the second group 118, and a second multiplexer 130 having inputs respectively coupled to the plurality of second taps 128. Therefore, the first number of sensor units 104 are selected in a flexible way by signaling the first multiplexer 126 to select one tap from the first taps 124 based on the third number and signaling the second multiplexer 130 to select another tap from the second taps 128 based on the fourth number. The outputs of both multiplexers 126, 130 may together form the first combined electrical signal, where a difference between the two outputs corresponds to a voltage difference across the N selected sensor units 104. In a preferred embodiment, the first number of sensor units 104 are evenly selected from the first and second groups 116 and 118.

In a preferred embodiment, the sensor system 100 includes an amplifying unit 132 coupled to the selecting unit 114 to improve sensitivity of the sensor system 100, wherein the amplifying unit 132 generates an amplified signal $V_{amp}$ based on the first combined electrical signal. The amplified signal $V_{amp}$ is an output of the sensor system 100 as the electrical signal converted by the sensor system 100 from the sensed physical quantity.

The amplifying unit 132 preferably includes at least a first amplifier 134 having two inputs that respectively coupled to outputs of the first and second multiplexers 126 and 130. In a preferred embodiment, the first amplifier 134 is a low noise amplifier (LNA) with two outputs that generate a pair of amplified differential signals. The amplifying unit 132 also includes a second amplifier 136 that generates the amplified signal $V_{amp}$ based on the pair of amplified differential signals. In a preferred embodiment, the amplifying unit 132 further includes one or more amplifiers coupled between the first and second amplifiers 134 and 136, for example, a third amplifier 138. In a preferred embodiment, the second and third amplifiers 136 and 138 are analog front-end modules with gains less than a gain of the first amplifier 134. For example, the gain of the first amplifier 134 is 10 times, and the gain of the second and third amplifiers 136 and 138 is 100 times. In an alternative example, the first amplifier 134 can be a part of a sensor module, for example, a wake-on-motion (WOM) sensor module, that generates a signal based on detection of a motion thereof. The sensor module further includes the sensor device 102 and the selecting unit 114, wherein output of the first amplifier 134 is an output of the sensor module.

The sensor system 100 further includes a calibrating unit 140 coupled to the selecting unit 132, determining a second number of sensor units 104 to be selected from the plurality of sensor units 104 based on the first combined electrical signal and generating a selecting signal 142 to calibrate the sensor system 100. In a preferred embodiment, the amplifying unit 132 is coupled between the selecting unit 114 and the calibrating unit 140, wherein the calibrating unit 140 determines the second number of sensor units 104 based on the amplified signal $V_{amp}$ that is generated based on the first combined electrical signal by the amplifying unit 132. The selecting unit 114 receives the selecting signal 142 indicating the second number of sensor units 104 to be selected, selects the second number of sensor units 104 instead of the first number of sensor units 104, and outputs a second combined electrical signal based on the second number of sensor units 104.

Referring to FIG. 3, a schematic block diagram of a calibrating unit 200, as the calibrating unit 140 in the sensor system 100 of FIG. 1 in accordance with an embodiment of the present invention, is shown. The calibrating unit 200 includes a comparator 202 and a controller 204 coupled to the comparator 202. The comparator 202 receives and compares the amplified signal $V_{amp}$ with a predetermined threshold $V_{th}$ and generates a comparison result, and the controller 204 determines the second number of sensor units 104 by increasing or decreasing the first number of sensor units 104 by a predetermined step size based on the comparison result. The controller 204 signals the selecting unit 114 to select the second number of sensor units 104 by generating the selecting signal 142 to the selecting unit 114.

The predetermined threshold $V_{th}$ is determined based on the known physical quantity applied to the sensor system 100, and the predetermined step size is configured based on a permissible error limit of the sensor system 100 according to characters of the sensor units 104. For example, if the permissible error limit is 3%, the predetermined step size is configured as two sensor units 104. Therefore, said increasing is performed by selecting two more sensor units 104 from at least one of the first and second groups 116 and 118, and said decreasing is performed by selecting two less sensor units 104 from at least one of the first and second groups 116 and 118. The controller 204 stops determining the second number of sensor units 104, for example, the sensor system 100 finishes said calibrating, if a difference between the amplified signal $V_{amp}$ and the predetermined threshold $V_{th}$ satisfies the permissible error limit of the sensor system 100. The controller 204 can be an on-chip micro control unit (MCU) (or microcontroller) of the sensor system 100. The comparator 202 can also be implemented as a part of the controller 204.

Referring to FIG. 4, a flow chart of a method 300 for calibrating a sensor system in accordance with an embodiment of the present invention is shown. The sensor system generates an electrical signal based on at least one sensed physical quantity, wherein the sensor system, shown as the sensor system 100 of FIG. 1, includes a plurality of sensor units 104 each generating an individual electrical signal in response to the at least one physical quantity. For example, the sensor system 100 is a force or pressure sensor system and the electrical signal is a voltage signal converted from the force or pressure sensed by the sensor system 100. Each sensor unit is a group of ferroelectric capacitors connected in parallel, and the plurality of sensor units 104 are arranged in series to form a lead zirconate titanate (PZT) strain sensor device. However, the sensor system 100 is not limited to be the force or pressure sensor system. For example, the sensor system 100 can be a stretch sensor system, or the like that generates an electrical signal based on a combination of individual signals respectively converted from a physical quantity by a plurality of sensor elements. To calibrate the sensor system 100, a known physical quantity is applied to the sensor system 100, more particularly, to the plurality of sensor units 104.

Starting at step 302, a selecting unit 114 of the sensor system 100 selects a first number of sensor units 104 from the plurality of sensor units 104. In a preferred embodiment, the plurality of sensor units 104 includes first and second groups of consecutively connected sensor units, wherein the first and second groups are connected at a joint node. Said selecting the first number of sensor units includes selecting, starting from the joint node, a third number of sensor units 104 from the first group and a fourth number of sensor units 104 from the second group.

At step 304, in response to the known physical quantity applied to the sensor system 100, more particularly, to the plurality of sensor units 104, the selecting unit 114 generates a first combined electrical signal based on the first number of sensor units 104. In a preferred embodiment, the first number of sensor units 104 is a sequence of consecutively connected sensor units 104, wherein the individual electrical signal is a voltage difference between first and second terminals of a sensor unit 104, and the first combined electrical signal is a voltage difference across the sequence of consecutively connected sensor units 104. In a preferred embodiment, a terminal of a sensor unit 104 of the first group that is connected to the joint node is the second terminal, and a terminal of a sensor unit 104 of the second group that is connected to the joint node is a first terminal, wherein said generating the first combined electrical signal includes outputting a voltage difference between the first terminal of a last sensor unit of the third number of sensor units away from the joint node, and the second terminal of a last sensor unit of the fourth number of sensor units 104 away from the joint node.

Preferably, at step 306, an amplifying unit 132 of the sensor system 100 generates an amplified signal based on the first combined electrical signal to improve sensitivity of the sensor system 100. In a preferred embodiment, said generating the amplified signal includes generating a pair of amplified differential signals based on the first combined electrical signal and generating the amplified signal based on the pair of amplified differential signals.

At step 308, a calibrating unit 140 of the sensor system 100 compares the amplified signal with a predetermined threshold, wherein the predetermined threshold $V_{th}$ is determined based on the known physical quantity applied to the sensor system 100. In a preferred embodiment, a comparison result of step 308 is a difference between the amplified signal and the predetermined threshold.

At step 310, the calibrating unit 140 determines whether the difference between the amplified signal and the predetermined threshold satisfies a permissible error limit of the sensor system 100. If the difference satisfies the permissible error limit, said calibrating is finished. Otherwise, at step 312, the calibrating unit 140 further determines a second number of sensor units 104 to be selected. In a preferred embodiment, the second number of sensor units 104 are determined by increasing or decreasing the first number of sensor units by a predetermined step size based on the comparison result, wherein the predetermined step size is configured based on a permissible error limit of the sensor system 100 according to characters of the sensor units 104. For example, if the permissible error limit is 3%, the predetermined step size is configured as two sensor units 104. Therefore, said increasing is performed by selecting two more sensor units 104 from the plurality of sensor units 104, and said decreasing is performed by selecting two less sensor units 104 from the plurality of sensor units 104. In a preferred embodiment, said determining the second number of sensor units 104 includes determining, starting from the joint node, a fifth number of sensor units 104 to be selected from the first group and a sixth number of sensor units 104 to be selected from the second group.

At step 314, the selecting unit 114 selects the second number of sensor units 104 from the plurality of sensor units 104 instead of the first number of sensor units 104. In a preferred embodiment, the second number of sensor units 104 are also consecutively connected in a sequence. Then moving back to step 304, the selecting unit 114 generates a second combined electrical signal based on the second number of sensor units 104. Said calibrating continues until the difference between the amplified signal and the predetermined threshold satisfies the permissible error limit of the sensor system 100.

The detailed description set forth above in connection with the appended drawings is intended as a description of presently preferred embodiments of the present invention, and is not intended to represent the only form in which the present invention may be practiced. It is to be understood that the same or equivalent functions may be accomplished by different embodiments that are intended to be encompassed within the spirit and scope of the present invention. In the drawings, like numerals are used to indicate like elements throughout.

The invention claimed is:

1. A system comprising:
a first group of sensor units coupled in series, wherein a first sensor unit of the first group is coupled to a joint terminal;
a second group of sensor units coupled in series, wherein a first sensor unit of the second group is coupled to the joint terminal;
a selecting unit coupled to the first group of sensor units and the second group of sensor units, wherein the selecting unit is configured to:
select a first number of serially connected sensor units from the first group of sensor units and the second group of sensor units; and
output a signal based on a differential voltage between a first terminal of the first number of serially connected sensor units and a last terminal of the first number of serially connected sensor units; and
a calibrating unit coupled to the selecting unit and configured to:
receive the signal;
compare the signal to a range value; and
in response to the signal being outside the range value, output a selection signal to the selecting unit,
wherein in response to the selection signal, the selecting unit is configured to select a second number of sensor units from the first group of sensor units and the second group of sensor units.

2. The system of claim 1, wherein:
the first number of serially connected sensor units includes an equal number of sensor units in the first group of sensor units and in the second group of sensor units.

3. The system of claim 1, wherein:
the second number of sensor units is determined based on a difference between the signal and the range value.

4. The system of claim 1, wherein:
each of the first group of sensor units and the second group of sensor units includes a plurality of capacitors arranged in parallel.

5. The system of claim 1, further comprising:
an amplifying unit coupled between the selecting unit and the calibrating unit, wherein the signal is amplified by the amplifying unit.

6. The system of claim 5, wherein the amplifying unit includes at least a first amplifier and a second amplifier coupled in series.

7. The system of claim 6, wherein a gain of the second amplifier is 10 times larger than a gain of the first amplifier.

8. The system of claim 1, wherein:
the joint terminal is configured to be coupled to a reference voltage; and
the system is configured to be calibrated based on the reference voltage.

9. The system of claim 1, wherein:
the first group of sensor units includes a first group of ferroelectric capacitors connected in parallel and configured as a first lead zirconate titanate (PZT) strain sensor device; and
the second group of sensor units includes a second group of ferroelectric capacitors connected in parallel and configured as a second PZT strain sensor device.

10. The system of claim 1, wherein:
the first number of serially connected sensor units includes the first sensor unit of the first group and the first sensor unit of the second group;

the first sensor unit of the first group includes: a first terminal coupled to a second sensor unit of the first group and the selecting unit, and a second terminal coupled to the joint terminal; and
the first sensor unit of the second group includes: a first terminal coupled to the joint terminal, and a second terminal coupled to a second sensor unit of the second group and the selecting unit.

11. The system of claim 1, wherein the selecting unit includes a first multiplexer coupled to the first group of sensor units and a second multiplexer coupled to the second group of sensor units.

12. A method comprising:
selecting, by a selecting unit coupled to a first group of sensor units and a second group of sensor units, a first number of serially connected sensor units from the first group of sensor units and the second group of sensor units, wherein a first sensor unit of the first group of sensor units is coupled to a joint terminal and a first sensor unit of the second group of sensor units is coupled to the joint terminal;
outputting, by the selecting unit, a signal based on a differential voltage between a first terminal of the first number of serially connected sensor units and a last terminal of the first number of serially connected sensor units;
receiving, by a calibrating unit, the signal;
comparing, by the calibrating unit, the signal to a range value;
in response to the signal being outside the range value:
outputting, by the calibrating unit, a selection signal coupled to the selecting unit; and
receiving, by the selecting unit, the selection signal; and
based on the selection signal, selecting, by the selecting unit, a second number of sensor units from the first group of sensor units and the second group of sensor units.

13. The method of claim 12, wherein:
the first number of serially connected sensor units includes an equal number of sensor units in the first group of sensor units and in the second group of sensor units.

14. The method of claim 12, wherein:
the second number of sensor units is determined based on a difference between the signal and the range value.

15. The method of claim 12, wherein:
each of the first group of sensor units and the second group of sensor units includes a plurality of capacitors arranged in parallel.

16. The method of claim 12, further comprising:
amplifying, by an amplifying unit coupled between the selecting unit and the calibrating unit, the signal.

17. The method of claim 16, wherein the amplifying unit includes at least a first amplifier and a second amplifier coupled in series, and wherein a gain of the second amplifier is 10 times larger than a gain of the first amplifier.

18. The method of claim 12, wherein:
providing a reference voltage to the joint terminal.

19. The method of claim 12, wherein:
the first group of sensor units includes a first group of ferroelectric capacitors connected in parallel and configured as a first lead zirconate titanate (PZT) strain sensor device; and
the second group of sensor units includes a second group of ferroelectric capacitors connected in parallel and configured as a second PZT strain sensor device.

20. The method of claim 12, wherein:
the first number of serially connected sensor units includes the first sensor unit of the first group and the first sensor unit of the second group;
the first sensor unit of the first group includes: a first terminal coupled to a second sensor unit of the first group and the selecting unit, and a second terminal coupled to the joint terminal; and
the first sensor unit of the second group includes: a first terminal coupled to the joint terminal, and a second terminal coupled to a second sensor unit of the second group and the selecting unit.

\* \* \* \* \*